US012591837B1

(12) United States Patent
Barrett et al.

(10) Patent No.: US 12,591,837 B1
(45) Date of Patent: Mar. 31, 2026

(54) DIGITAL PLATFORM SUPPLY CHAIN SOLUTIONS SYSTEM

(71) Applicant: Bank of America Corporation, Charlotte, NC (US)

(72) Inventors: Gregory Barrett, Charlotte, NC (US); Rachel A. Lauck, Scranton, PA (US); Duncan Edward Lodge, London (GB); Robin E. Tooker, Charlotte, NC (US); Lesley Roxe McNamara, New York, NY (US); Mark D. Zanzot, Charlotte, NC (US); Teela Phuong Yung, Hacienda Heights, CA (US); Madhav Goparaju, Chicago, IL (US); Hiro O. Atsumi, New York, NY (US); Ilian Radev, Chicago, IL (US); Kelly M. Murray, Plano, TX (US); David J. McGinness, Matthews, NC (US); Geoffrey Brady, New York, NY (US); Matthew Vincent, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/960,165

(22) Filed: Nov. 26, 2024

(51) Int. Cl.
| | |
|---|---|
| *G06F 16/93* | (2019.01) |
| *G06F 40/205* | (2020.01) |
| *G06Q 10/08* | (2024.01) |
| *G06V 30/19* | (2022.01) |

(52) U.S. Cl.
CPC ............. *G06Q 10/08* (2013.01); *G06F 16/93* (2019.01); *G06F 40/205* (2020.01); *G06V 30/19* (2022.01)

(58) Field of Classification Search
CPC ....... G06Q 10/0833; G06Q 10/063114; G06Q 10/087

USPC .................................................. 705/333, 342
See application file for complete search history.

(56) References Cited

U.S. PATENT DOCUMENTS

| | | | |
|---|---|---|---|
| 11,429,927 B1 * | 8/2022 | Melancon | G06Q 10/087 |
| 2020/0111033 A1 * | 4/2020 | Mahajan | G06Q 10/04 |
| 2020/0118074 A1 * | 4/2020 | Natarajan | G06Q 10/087 |
| 2022/0398528 A1 * | 12/2022 | Gupta | G06Q 10/063 |
| 2022/0405775 A1 * | 12/2022 | Siebel | G06Q 30/0202 |

OTHER PUBLICATIONS

"Impact of OCR errors on the use of digital libraries" Published by IEEE (Year: 2017).*

* cited by examiner

*Primary Examiner* — Zeina Elchanti
(74) *Attorney, Agent, or Firm* — Weiss & Arons LLP

(57) ABSTRACT

Systems and methods for providing digital platform supply chain solutions for an integrated supply chain automation platform by transforming official, standard physical documentation into official, standard digital documentation. The systems and methods may include an integrated supply chain automation platform. The systems and methods may include an artificial intelligence/machine learning ("AI/ML") processor. The AI/ML processor may be operable to parse uploaded documents, output matched documents, and identify discrepancies within the platform. The systems and methods may include a network of applications. The network of applications may be contained in a hybrid cloud environment. The systems and methods may include a middleware engine. The middleware engine may be operable to connect, within the hybrid cloud environment: the platform, the AI/ML processor, and the network of applications.

18 Claims, 8 Drawing Sheets

300

DIGITAL CONNECTED TRADE NETWORK

Data Layer

308

Participant Layer

306

Provider Layer

304

Financial
Institutions  310

Buyer

Platform

302

Supplier

312

Data
Aggregators

320

Logistics  314

Data
Providers

316

Industry
Ecosystems

318

Figure 5B:
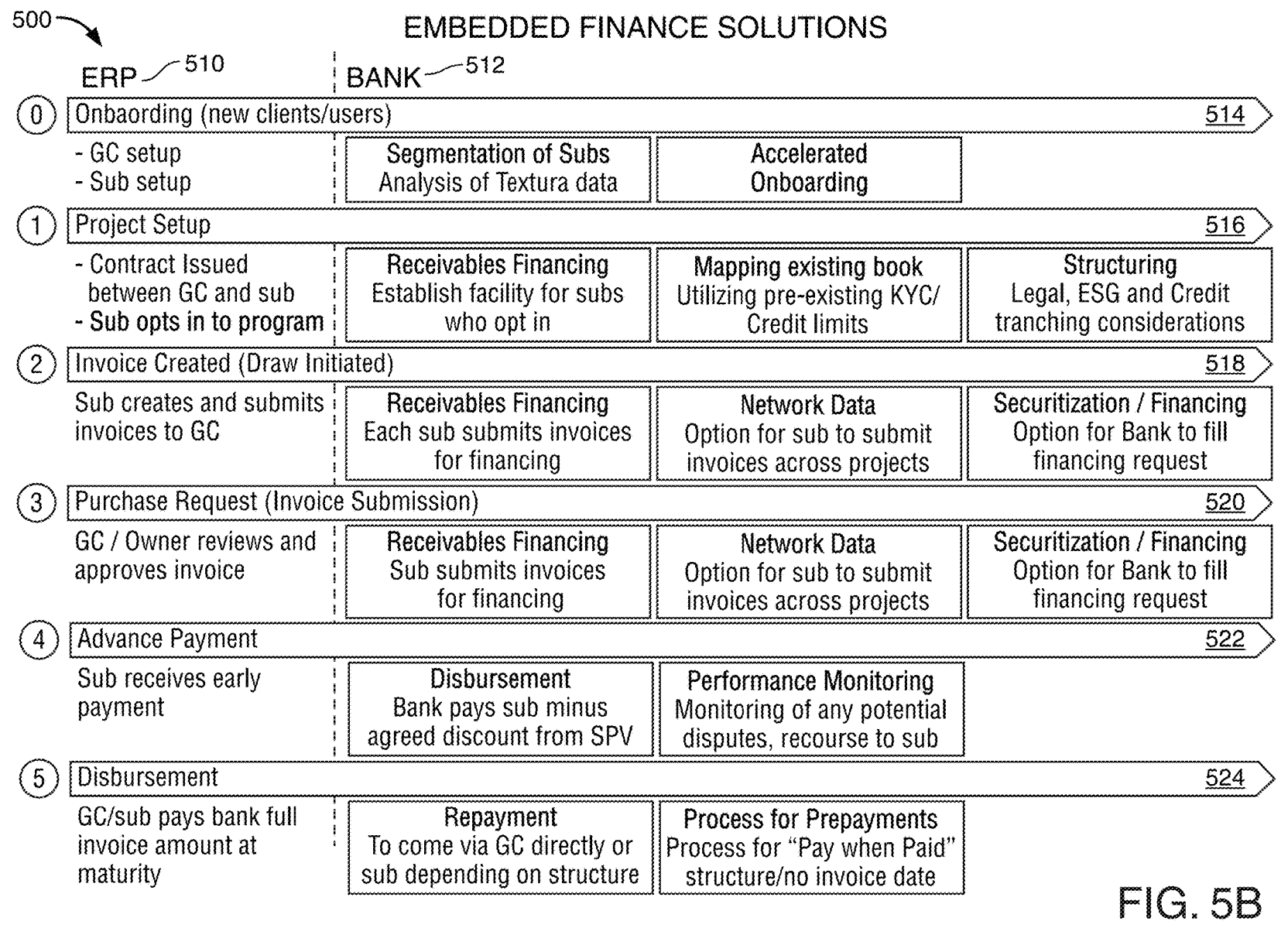

500

EMBEDDED FINANCE SOLUTIONS

ERP — 510     BANK — 512

(0) Onboarding (new clients/users) — 514
- GC setup
- Sub setup

BANK:
- Segmentation of Subs — Analysis of Textura data
- Accelerated Onboarding

(1) Project Setup — 516
- Contract Issued between GC and sub
- Sub opts in to program BANK:
- Receivables Financing — Establish facility for subs who opt in
- Mapping existing book — Utilizing pre-existing KYC/Credit limits
- Structuring — Legal, ESG and Credit tranching considerations

(2) Invoice Created (Draw Initiated) — 518
- Sub creates and submits invoices to GC BANK:
- Receivables Financing — Each sub submits invoices for financing
- Network Data — Option for sub to submit invoices across projects
- Securitization / Financing — Option for Bank to fill financing request

(3) Purchase Request (Invoice Submission) — 520
- GC / Owner reviews and approves invoice BANK:
- Receivables Financing — Sub submits invoices for financing
- Network Data — Option for sub to submit invoices across projects
- Securitization / Financing — Option for Bank to fill financing request

(4) Advance Payment — 522
- Sub receives early payment

BANK:
- Disbursement — Bank pays sub minus agreed discount from SPV
- Performance Monitoring — Monitoring of any potential disputes, recourse to sub

(5) Disbursement — 524
- GC/sub pays bank full invoice amount at maturity

BANK:
- Repayment — To come via GC directly or sub depending on structure
- Process for Prepayments — Process for "Pay when Paid" structure/no invoice date

EMBEDDED FINANCE SOLUTIONS

602

| Process Framework |
|---|

⓪ Onboarding: To be determined based on Bank's selection criteria

① Project Setup: Setting up of KYC/Credit limits and integration of ESG, Performance risk and prepayment risk into notes valuation ② Invoice creation: Sub submits invoice to GC ③ Purchase request: GC approves invoice, "Pay when paid structure" to be discussed with respect to due date ④ Advanced Payment: Sub receives early payment via SPV (Funds raised from noteholders)

⑤ Disbursement: Payment returned to SPV and to noteholders, coming either directly from the GC or from via the sub

604

| Structural & Financing Considerations |
|---|

• Some receivables may need to be pass straight through to SPV

• Buyer-led or supplier-led structure (subcontractor-led is also possible)

• Markets would be responsible for distribution of notes to investors

• LEEDs Certificate will be used for sustainable finance

• Financing considerations: Sub Revenue, Receivables size, Debtor location, tracking/reporting, Prepayments, ESG, Performance history

606

| Roles in Structure |
|---|

608

| GPS |
|---|

610

| Financing/Markets |
|---|

• Conduit with ERP and owner of data provided

• Owner of relationships with contractors/sub-contractors

• Oversight on process flow

• Pricing of notes using data provided by ERP/GPS

• Owner of relationships with noteholders

FIG. 6A

DIGITAL PLATFORM SUPPLY CHAIN SOLUTIONS SYSTEM

FIELD OF TECHNOLOGY

Aspects of the disclosure relate to digital platform supply chain solutions. Aspects of the disclosure particularly relate to digital platform supply chain solutions for an integrated supply chain automation platform.

BACKGROUND OF THE DISCLOSURE

International organizations including the United Nations ("UN") Commission on International Trade Law, the G7 Trade Ministers, and the World Trade Organization ("WTO") have been crafting policies to evolve legal documentation associated with international trade. One of their goals is to move from paper documents and wet signatures to electronic documentation and signatures. These international bodies have drafted legal frameworks so nations participating in international trade can translate this goal into law and regulations within their jurisdictions.

Today, most international trade flows are documented using physical paper. Because paper copies are the only legally permissible records, the documentation paper must transit with the shipped goods and services, thereby requiring couriers, document capture, faxes, and people resources. As a result, regulations, product designs, and operational processes and systems are all designed around the receipt and processing of paper documents as the legal record of the trade instruments (e.g., purchase orders, invoices, customs forms, and letters of credit).

To transition to an electronic world, front- and back-office applications, as well as operational processes, may be redesigned around the premise that electronic documents and signatures may become a new legally binding record of trade transactions. This involves rethinking not only banking systems that often facilitate these trade activities but also all the participants inclusive of, but not limited to, e.g., logistics providers, freight forwarders, customs agencies, and factoring companies.

This disclosure addresses the above issues via a connected trade ecosystem of technology providers, e.g., digital platform supply chain solutions. It would be desirable to provide digital platform supply chain solutions as an integrated system of products and services (e.g., supply chain finance ("SCF"), traditional trade, risk distribution, and sanctions screening). It would be further desirable for the integrated system of products and services to support this transition to electronic records by providing a technology blueprint for managing digital trade products and corresponding processes.

SUMMARY OF THE DISCLOSURE

Provided herein are systems and methods of digital platform supply chain solutions for integrated supply chain automation platforms. Digital platform supply chain solutions may provide a connected ecosystem of providers and defined data standards for integrated supply chain automation platforms. Digital platform supply chain solutions may facilitate and/or accelerate the industry conversion of trade instruments into digital formats.

The systems and methods may enable a suite of technology solutions designed to solve the needs of entities and trade product providers that participate in international trade. The systems and methods may identify solution providers that meet the needs of global banks and other facilitators of international trade, and integrate them into a cloud-based network of applications.

While there are many technology providers already in the trade space, few of them offer products that are comprehensive enough to meet the needs of entities addressing regulatory and compliance needs, cybersecurity, scale, and the resilience and level of service needed to support large multi-national clients with complex, globally dispersed supply chains. The systems and methods may identify the optimal suppliers for each of the components needed to run a trade financing business and work with them to enhance their solutions and integrate them into a digital platform supply chain solution of products and services.

The systems and methods may include a hybrid cloud solution. The systems and methods may include a set of integrated products with defined data and security standards. The defined data and security standards may align with data standards proposed by organizations (e.g., the WTO) for trade products. The systems and methods may include a connected trade network. The connected trade network may be hosted in a secure external cloud.

The systems and methods may include a network of applications. The network of applications may be contained within a cloud environment. The network of applications may be integrated together using a middleware solution that allows the platforms to work together and transmit data between the applications using standardized APIs and other transmission protocols. This network of applications and services may allow entities and other providers of trade products to join and take advantage of a suite of solutions that solve for SCF (e.g., payables and receivables), letters of credit, guarantees, compliance checking, risk distribution, and other solutions that are needed for conducting business and supporting buyers and suppliers involved in international trade.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout.

FIG. 5B shows a second part of illustrative process flow 500 for an integrated supply chain automation platform in accordance with principles of the disclosure.

FIG. 6A shows a first part of illustrative process flow 600 for an integrated supply chain automation platform in accordance with principles of the disclosure.

DETAILED DESCRIPTION OF THE DISCLOSURE

Figure 1:
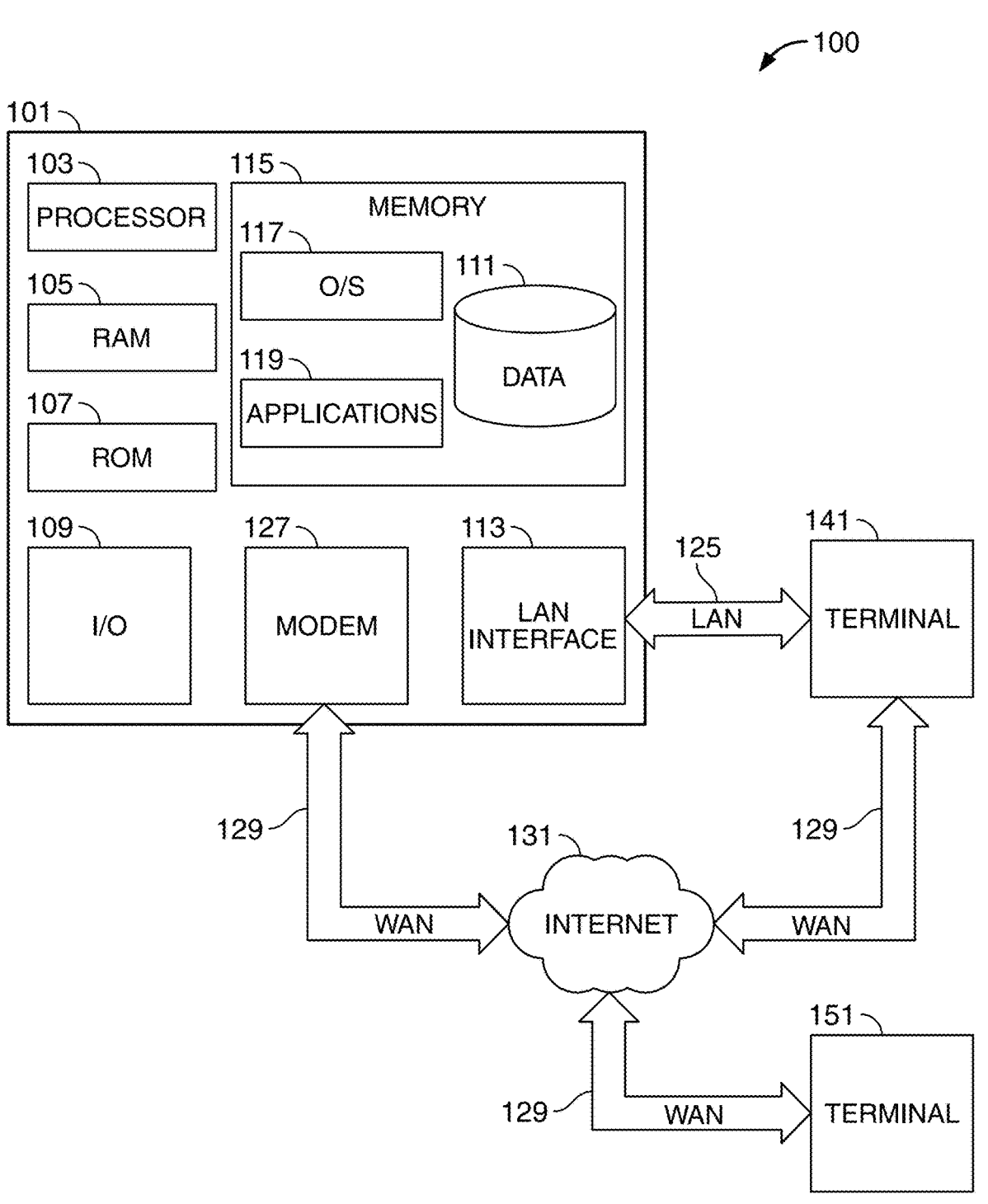
FIG. 1 shows a schematic diagram 100 in accordance with principles of the disclosure.

Systems and methods are provided for digital platform supply chain solutions for integrated supply chain automation platforms. The systems and methods may use artificial intelligence ("AI") and/or machine learning ("ML").

The systems may provide digital platform supply chain solutions for an integrated supply chain automation platform by transforming physical documentation into digital documentation. The systems may include an integrated supply chain automation platform ("the platform"). The platform may include a plurality of integrated supply chain automation processors.

The systems may include an AI/ML processor. The AI/ML processor may be operable to parse uploaded documents, output matched documents, and identify discrepancies within the platform. The platform may use one or more AI/ML algorithms to parse uploaded documents, output matched documents, and identify discrepancies.

The systems may include a network of applications. The network of applications may be contained in a hybrid cloud environment.

The systems may include a middleware engine. The middleware engine may be operable to connect, within the hybrid cloud environment: the platform, the AI/ML processor, and the network of applications.

The systems may be operable to receive, via the integrated supply chain automation platform, scans of physical documentation for supply chain transactions. The systems may be operable to perform, via the AI/ML processor, optical character recognition ("OCR") on the scans of physical documentation for the supply chain transactions producing digital data. The digital data may include digital forms of physical documentation for the supply chain transactions.

The systems may be operable to transmit, via the middleware engine, the digital data to the network of applications using application programming interfaces ("APIs") in the plurality of integrated supply chain automation processors. The systems may be operable to enable, via the network of applications, a plurality of entities to use the digital data for SCF operations.

The systems may be operable to perform, via the AI/ML processor, natural language processing ("NLP") on the digital data. The NLP may produce output regarding digital data complying with digital data standards.

The systems may be operable to compare, via the AI/ML processor, the output to document standard trade product definitions ("DSTPD"). The DSTPD may include the digital data standards.

The systems may be operable to modify, via the platform, trade products and associated operational delivery products for the supply chain transactions to bring the digital data into compliance with the digital data standards. The systems may be operable to execute, via the platform, the supply chain transactions based on the digital data, the SCF operations, the trade products, and associated operational delivery products.

The systems may include SCF operations including payables and receivables, letters of credit, guarantees, compliance checking, risk distribution, and operations conducting business with buyers and suppliers involved in international trade. The systems may include the DSTPD including standards for Letters of Credit ("LCs"), Standby Letters of Credit ("SBLCs"), and Guarantees to UCP600, URDG 758, and ISP98.

The systems may include digital data standards defined by WTO. The systems may include the platform including a manual override, the manual override operable to deny the supply chain transactions.

The systems may include the platform within a provider layer. The provider layer may interact, via the middleware engine, with a participant layer. The participant layer may be within a data layer. The data layer may include data aggregators, industry ecosystems, and data providers.

The systems may execute supply chain transactions. The supply chain transactions may include stages. The stages may include pre-transaction, order, fulfillment & matching, and discrepancy matching. The pre-transaction may include supply chain sourcing and selection.

The order may include supply chain procurement. The fulfillment & matching may include purchase order fulfillment. The discrepancy matching may include managing discrepancies in the digital data. The AJ/ML processor may parse uploaded documents, output matched documents, and identify discrepancies within the platform.

The systems may expand a data set within the platform. The systems may increase efficiency of AI/ML decisioning and transactions within the platform by analysis of the digital data. The platform may be operable to execute additional supply chain transactions with the plurality of entities by the system increasing a transparency of the digital data. The platform may be operable to execute additional supply chain transactions with the plurality of entities by the system providing the platform access to external transactions.

The methods may provide digital platform supply chain solutions for an integrated supply chain automation platform by transforming physical documentation into digital documentation. The methods may include receiving, via the platform, scans of physical documentation for supply chain transactions.

The methods may include performing, via an AI/ML processor, OCR on the scans of physical documentation for the supply chain transactions producing digital data. The digital data may include digital forms of the physical documentation for the supply chain transactions.

The methods may include transmitting, via a middleware engine, the digital data to the network of applications using APIs in the plurality of integrated supply chain automation processors.

The methods may include enabling, via a network of applications, a plurality of entities to use the digital data for SCF operations. The methods may include performing, via the AI/ML processor, NLP on the digital data. The NLP may produce output regarding the digital data complying with digital data standards.

The methods may include comparing, via the AI/ML processor, the output to DSTPD. The DSTPD may include the digital data standards. The methods may include modifying, via the platform, trade products and associated operational delivery products for the supply chain transactions to bring the digital data into compliance with the digital data standards.

The methods may include executing, via the platform, the supply chain transactions based on the digital data, the SCF operations, the trade products, and associated operational delivery products.

The methods may include the SCF operations including payables and receivables, letters of credit, guarantees, compliance checking, risk distribution, and operations conducting business with buyers and suppliers involved in international trade.

The methods may include the DSTPD including standards for LCs, SBLCs, and Guarantees to UCP600, URDG 758, and ISP98. The methods may include the digital data standards defined by WTO. The methods may include the platform including a manual override. The manual override may be operable to deny the supply chain transactions.

The methods may include operating the platform within a provider layer. The provider layer may interact, via the middleware engine, with a participant layer. The participant layer may include a buyer, a supplier, the plurality of entities, and logistics. The participant layer may be within a data layer. The data layer may include data aggregators, industry ecosystems, and data providers.

The methods may include executing supply chain transactions. The supply chain transactions may include a stage of pre-transaction including supply chain sourcing and selection. The supply chain transactions may include a stage of order including supply chain procurement. The supply chain transactions may include a stage of fulfillment & matching including purchase order fulfillment.

The supply chain transactions may include a stage of discrepancy matching including managing discrepancies in the digital data. The AI/ML processor may parse uploaded documents, output matched documents, and identify discrepancies within the platform.

The methods may include expanding a data set within the platform. The methods may include increasing efficiency of AI/ML decisioning and transactions within the platform by analysis of the digital data.

The methods may include the platform being operable to execute additional supply chain transactions with the plurality of entities by increasing a transparency of the digital data. The methods may include the platform being operable to execute additional supply chain transactions with the plurality of entities by providing the platform access to external transactions.

The systems and methods may provide a secure hybrid cloud environment. The systems and methods may include digital platform supply chain solutions. The digital platform supply chain solutions may run on a hybrid cloud environment that meets the technology, scale, and security needs of, e.g., the banking industry.

The systems and methods may include pre-built integration between multiple providers. Small and mid-sized enterprises ("SMEs") and entities (e.g., business and technology) may develop the standards, mechanisms, and connectivity needed to integrate the front- and back-office systems into a cohesive system used to deliver the trade ecosystem reducing the technology and project resources needed and lift for future participants.

The systems and methods may include adapting standards for data structure and flows, integrating systems, and standardizing a set of APIs/file transfer mechanisms to allow other providers and users of this system (e.g., buyers, sellers, banks, financial institutions, and other entities) to integrate into the ecosystem.

Commercial letters of credit may follow a set of international guidelines originally drafted by the International Chamber of Commerce ("ICC") in 1933 and updated since. The current version is the Uniform Customs and Practice for Documentary Credits ("UCP 600"), which was released in 2007. Guarantees follow the Universal Rules for Demand Guarantees ("URDG 758") drafted and adopted by the ICC in 1991. Standby letters of credit are governed by International Standby Practices ("ISP98") published by the ICC in 1998.

The systems and methods may include conformance to industry standards. The WTO has crafted digital standards for the migration of trade products to digital formats. The systems and methods may conform to these international standards as well as official document standards (e.g., UCP600, URDG 758, and ISP98).

The systems and methods may include data security and regulatory compliance. The systems and methods may conform to some, most, and/or all standards for data security, records retention, and regulatory compliance. There may be additional regulations whereby a new participant may need to enhance the systems and methods (e.g., operating in a new jurisdiction or offering a product not considered as part of the initial build).

The systems and methods may include enhanced product offerings for individual components. Entities and operational SMEs may work with individual providers to enhance their products to meet the needs of large entities (e.g., multiple booking branches, multiple base rate and spread configurations, and bookkeeping and accounting of trade instruments).

The systems and methods may include enhanced application workflows. The enhanced application workflows may represent new processes related to initiating, booking, and closing out transactions at maturity for end-to-end transactions where all aspects of the process flow are completed using digital formats accelerating decisions on discrepancies. The systems and methods may include digitizing client supplier experience (e.g., matching rules for open account processing). The systems and methods may include document inspection process for Letters of Credit ("LCs") and customs documentation.

The systems and methods may include applying AI, optical character recognition ("OCR"), and Natural Language Processing ("NLP") to digital documentation to compare LCs, Standby Letters of Credit ("SBLCs"), and Guarantees to the UCP600, URDG 758, and ISP98 document standard definitions trade product solutions expansion (e.g., breath of expansion). The systems and methods may include digital standards. The digital standards may require trade products and the associated operational delivery to be modified to support the newly defined fields and digital data definitions, as defined by WTO standards.

The systems and methods may include expanding feature sets by enhancing digital data. The systems and methods may include buyer-funded early discounts on purchase of receivables, in addition to entity purchase. The systems and methods may include the ability to offer inventory finance due to better access and standardization of underlying data.

The systems and methods may include technological advancements to expand data sets and the analysis thereof to make more informed credit decisions. The systems and methods may include the ability to sell more instruments to the market (e.g., risk distribution) with an enhanced view of the underlying credit risk. The systems and methods may include an increased ability to sell to the growing list of market participants due to the increased transparency of the data and underlying credit risk, and improved access to external financing due to better technology and distribution tools (e.g., marketplace).

The systems and methods may include product redesigns. The systems and methods may include converting the existing processes commonly used for paper documents and wet signatures needing people resources for processing and converting workflows to support fully digital document processing (e.g., automation, and using AI and NLP for document comparison and processing).

The systems and methods may include an API middleware concept (e.g., connected trade). The systems and methods may include creating digital standards to align applications in the end-to-end trade process (e.g., initiation, credit risk, anti-money laundering ("AML"), booking, and maturity) to create a seamless flow through back-office processes with unified data and tools. This middleware and services layer may create a "bridge" between the different applications listed above to allow the integrated applications to communicate and transmit data between them in a standardized way.

The systems and methods may include building an ecosystem for an entity. The systems and methods may include participating with other entities and trade participants. The systems and methods may level the playing field and commoditize tools to, e.g., align to industry standards. The systems and methods may include changing the dynamic to, for example, relationships, trust, etc. The systems and methods may include designing standardized interfaces for other industry entities to connect the ecosystem to their entity systems.

Systems and methods described herein are illustrative. Systems and methods in accordance with this disclosure will now be described in connection with the figures, which form a part hereof. The figures show illustrative features of system and method steps in accordance with the principles of this disclosure. It is understood that other embodiments may be utilized, and that structural, functional, and procedural modifications may be made without departing from the scope and spirit of the present disclosure.

The steps of methods and systems may be performed in orders beyond the order shown and/or described herein. Embodiments may omit steps shown and/or described in connection with illustrative methods. Embodiments may include steps that are neither shown nor described in connection with illustrative methods.

Illustrative methods and systems steps may be combined. For example, an illustrative method may include steps shown in connection with another illustrative method.

Methods and systems may omit features shown and/or described in connection with illustrative methods and systems. Embodiments may include features that are neither shown nor described in connection with the illustrative methods and systems. Features of illustrative methods and systems may be combined. For example, an illustrative embodiment may include features shown in connection with another illustrative embodiment.

The drawings show illustrative features of methods and systems in accordance with the principles of the disclosure. The features are illustrated in the context of selected embodiments. It will be understood that features shown in connection with one of the embodiments may be practiced in accordance with the principles of the disclosure along with features shown in connection with another of the embodiments.

One of ordinary skill in the art will appreciate that the steps shown and described herein may be performed in other ways and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a LAN 125 and a wide area network ("WAN") 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The disclosure may be described in the general context of computer-executable instructions, such as program modules, being executed by a computer. Generally, program modules include routines, programs, objects, components, data structures, etc., that perform tasks or implement abstract data types. The disclosure may also be practiced in distributed computing environments where tasks are performed by remote processing devices that are linked through a communications network. In a distributed computing environment, program modules may be in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

Figure 2:
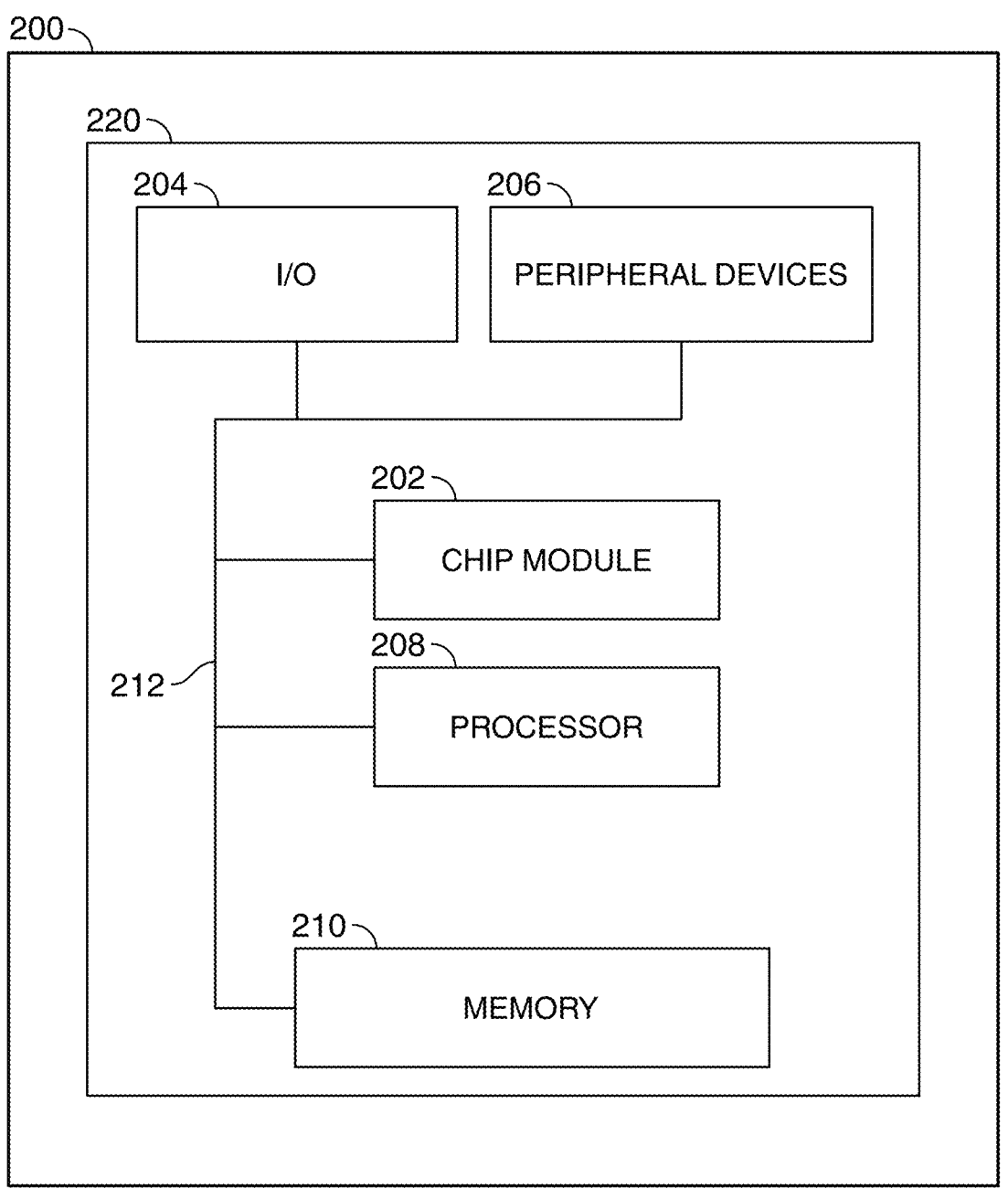
FIG. 2 shows another schematic diagram 200 in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
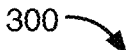
FIG. 3 shows an illustrative process flow 300 for an integrated supply chain automation platform in accordance with principles of the disclosure.

FIG. 3 shows illustrative process flow 300 for an integrated supply chain automation platform in accordance with the principles of the disclosure.

Illustrative process flow 300 may include a digital connected trade network. The digital connected trade network may include a platform 302. The digital connected trade network may include a provider layer 304. The digital connected trade network may include a participant layer 306. The digital connected trade network may include a data layer 308.

The platform 302 may be located within the provider layer 304. The provider layer 304 may interact with the participant layer 306.

The provider layer 304 may be located within the participant layer 306. The participant layer 306 may include, e.g., a buyer, a supplier 312, entities, e.g., financial institutions 310, and logistics 314.

The participant layer 306 may be located within the data layer 308. The data layer 308 may include, e.g., data providers 316, industry ecosystems 318, and data aggregators 320.

Figure 4:
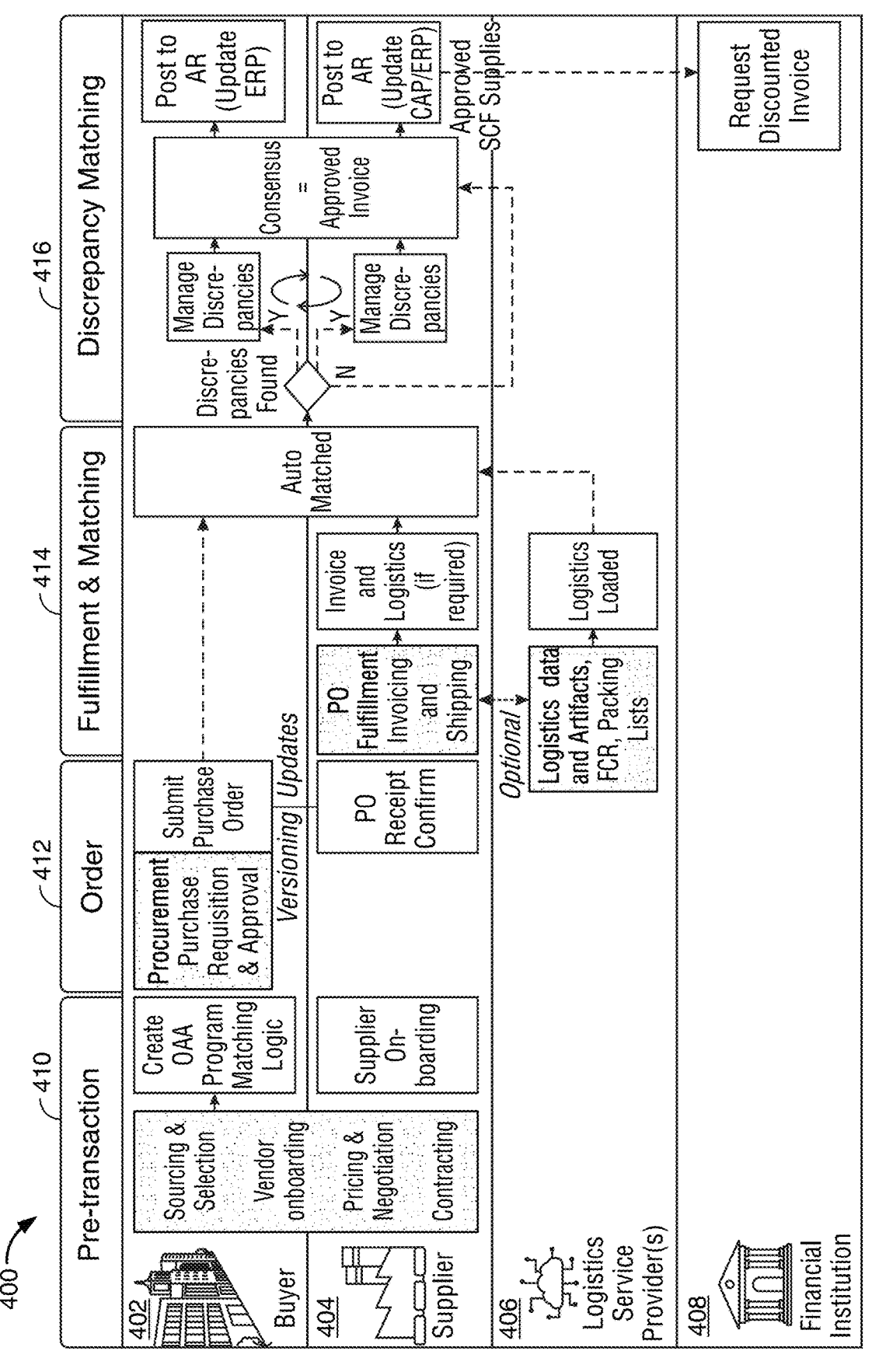
FIG. 4 shows an illustrative process flow 400 for an integrated supply chain automation platform in accordance with principles of the disclosure.

FIG. 4 shows illustrative process flow 400 for an integrated supply chain automation platform in accordance with the principles of the disclosure.

The illustrative process flow 400 may include, e.g., a pre-transaction 410, an order 412, a fulfillment & matching 414, and a discrepancy matching 416.

The illustrative process flow 400 may include, e.g., a buyer 402, a supplier 404, a logistics service provider(s) 406, and an entity, e.g., a financial institution 408. The buyer 402, the supplier 404, the logistics service provider(s) 406, and the entity, e.g., the financial institution 408, may each be involved in each of the pre-transaction 410, the order 412, the fulfillment & matching 414, and the discrepancy matching 416.

The pre-transaction 410 may include the buyer 402 and the supplier 404 being involved in sourcing and selection, vendor onboarding, pricing and negotiation, and contracting. The buyer 402 may be involved in creating open account agreement ("OAA") program matching logic. The supplier 404 may be involved in supplier onboarding.

The order 412 may include the buyer 402 being involved in procurement purchase requisition and approval, submitting a purchase order, and versioning updates. The supplier 404 may confirm receipt of the purchase order ("PO").

The fulfillment & matching 414 may include the supplier 404 being involved in PO fulfillment, invoicing, and shipping. This may lead to an invoice and logistics (if required).

The fulfillment & matching 414 may include the logistics service provider(s) 406 optionally providing, e.g., logistics data and artifacts, a forwarder's certificate of receipt ("FCR"), and packing lists. This may lead to loading logistics.

The fulfillment & matching 414 may include the buyer 402 being involved in auto-matching the invoice and the logistics from the supplier 404 and the logistics service provider(s) 406.

The discrepancy matching 416 may include the buyer 402 finding discrepancies in the invoices and/or logistics. If discrepancies are found, the buyer 402 and the seller 404 may manage the discrepancies. If the buyer 402 and the seller 404 reach a consensus, the invoice and/or the logistics may be approved.

The buyer 402 may post the approval to accounts receivable ("AR") (update enterprise resource planning ("ERP")). The seller 404 may post to AR (update credit approval process ("CAP")/ERP). The seller 404 may approve SCF supplies and send them to the entity, e.g., the financial institution 408. The entity, e.g., the financial institution 408, may request a discounted invoice.

Figure 5A:
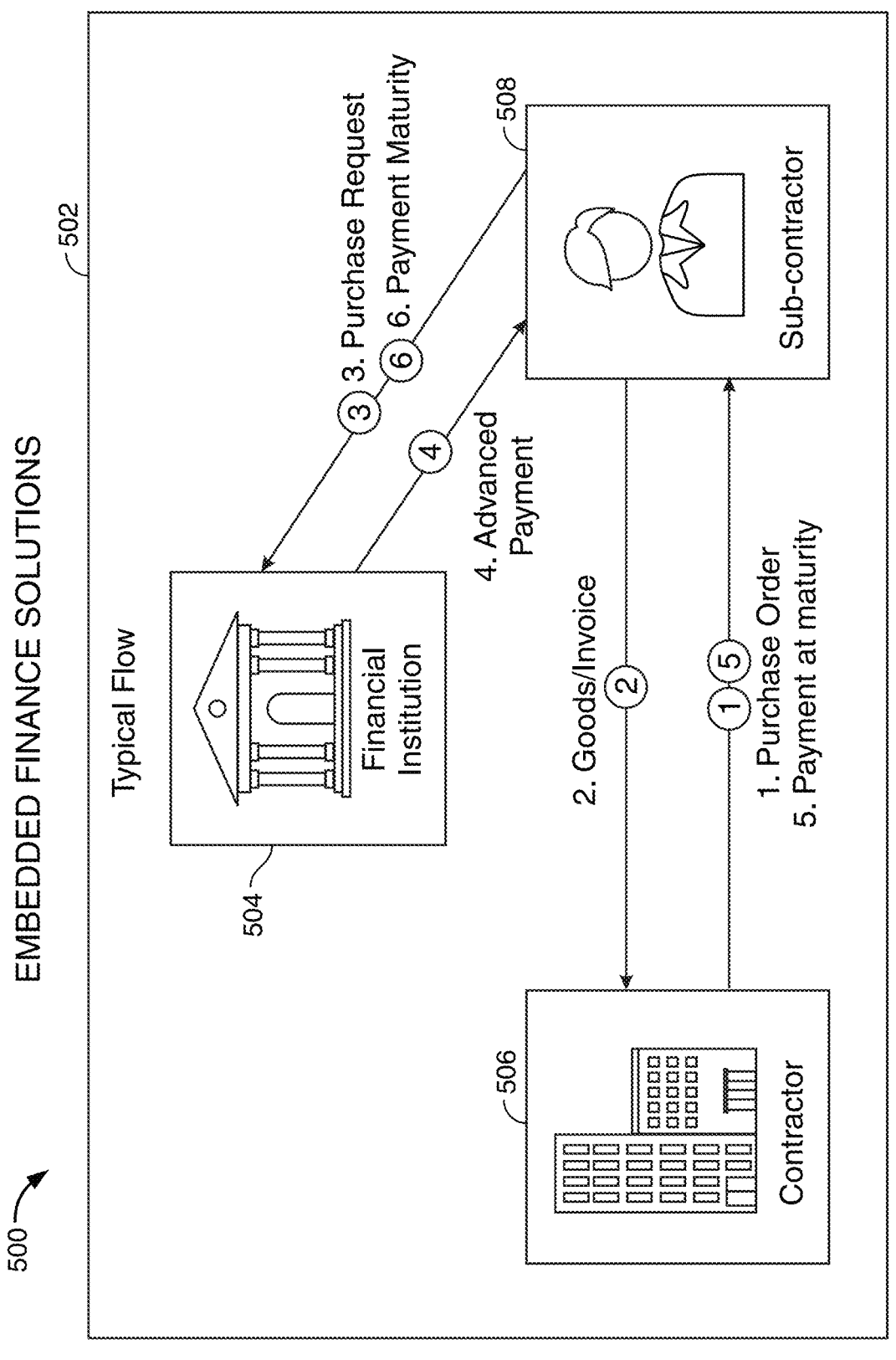
FIG. 5A shows a first part of illustrative process flow 500 for an integrated supply chain automation platform in accordance with principles of the disclosure.

FIG. 5A shows a first part of illustrative process flow 500 for an integrated supply chain automation platform in accordance with the principles of the disclosure.

Illustrative process flow 500 may include embedded finance solutions, which may be the same or different from other disclosed embedded finance solutions. The embedded finance solutions may include a typical flow. The typical flow may include an entity, e.g., a financial institution 504, a sub-contractor 508, and a contractor 506. The financial institution 504 may be in two-way communication with the sub-contractor 508. And the sub-contractor 508 may be in two-way communication with the contractor 506.

The sub-contractor 508 two-way communication with the contractor 506 may include the contractor 506 communicating with the sub-contractor 508 and the sub-contractor 508 communicating with the contractor 506. The contractor 506 communicating with the sub-contractor 508 may include: (1) a purchase order and (5) a payment at maturity. And the sub-contractor 508 communicating with the contractor 506 may include: (2) goods/invoice.

The financial institution 504 two-way communication with the sub-contractor 508 may include the sub-contractor 508 communicating with the financial institution 504 and the financial institution 504 communicating with the sub-contractor 508. The sub-contractor 508 communicating with the financial institution 504 may include: (3) a purchase request and (6) a payment maturity. And the financial institution 504 communicating with the sub-contractor 508 may include: (4) advanced payment.

FIG. 5B shows a second part of illustrative process flow 500 for an integrated supply chain automation platform in accordance with the principles of the disclosure.

Illustrative process flow 500 may include additional embedded financial solutions. The additional embedded financial solutions may include enterprise resource planning ("ERP") 510 and entity or bank 512.

ERP 510 may send digital data to entity or bank 512. The digital data may be sent during step 0, 514; step 1, 516; step 2, 518; step 3, 520; step 4, 522; and step 5, 524.

Step 0, 514 may include onboarding new clients and/or users. The ERP 510 may be involved in general contractor ("GC") and subcontractor ("sub") setup. The entity or bank 512 may be involved in segmentation of sub(s), analysis of Textura data, and accelerated onboarding.

Step 1, 516 may include project setup. The ERP 510 may be involved in a contract issued between the GC and the sub(s). The sub(s) may opt in to a program and the ERP 510 may assist. The bank 512 may establish a receivables financing facility for sub(s) that opt in. The bank 512 may map an existing book by utilizing pre-existing "know-your-customer" ("KYC") information and credit limits. The bank 512 may be involved in structuring legal, environmental, social, and governmental ("ESG"), and credit tranching considerations.

Step 2, 518 may include creating invoices (initiating draws). The ERP 510 may enable the sub(s) to create and submit invoices to the GC. The bank 512 may enable, via the receivables financing, each sub to submit invoices for financing. The bank 512 may enable, via network data, an option for the sub(s) to submit invoices across projects. The bank 512 may enable, via securitization and financing, an option for the bank 512 to fill a financing request.

Step 3, 520 may include purchase request (invoice submission). The ERP 510 may enable GC/owner reviews and invoice approvals. The bank 512 may enable, via the receivables financing, each sub to submit purchase requests for financing. The bank 512 again may enable, via network data, an option for the sub(s) to submit purchase requests across projects. The bank 512 may enable, via securitization and financing, an option for the bank 512 to fill a financing request.

Step 4, 522 may include advance payment. The ERP 510 may be involved in the sub(s) receiving an early payment. The bank 512 may be involved in disbursement. The disbursement may include the bank 512 paying the sub(s) minus an agreed discount from a special purpose vehicle ("SPV"). The bank 512 may be involved in performance monitoring. The performance monitoring may include monitoring of any potential disputes and potential recourse to each sub.

Step 5, 522 may include disbursement. The ERP 510 may be involved in the GC/sub(s) paying the bank 512 a full invoice amount at maturity. The bank 512 may be involved in repayment. The repayment may come via GC directly or sub depending on the structure of the setup. The bank 512 may be involved in process for prepayments. The process for prepayments may include processing for "pay when paid" structure and/or no invoice date.

FIG. 6A shows a first part of illustrative process flow 600 for an integrated supply chain automation platform in accordance with the principles of the disclosure. Illustrative process flow 600 may include embedded finance solutions, which may be the same or different from other disclosed embedded finance solutions.

The embedded finance solutions may be located within illustrative process flow 600. The embedded finance solutions may include a process framework 602. The embedded finance solutions may include structural and financing considerations 604. The embedded finance solutions may include roles in structure 606. The embedded finance solutions may include global satellite positioning ("GPS") 608. The embedded finance solutions may include financing/markets 610.

Process framework 602 may include: (0) onboarding: to be determined based on an entity's (e.g., bank's) selection criteria; (1) project setup: setting up KYC/credit limits and integration of ESG, performance risk and prepayment risk into notes valuation; (2) invoice creation: a sub submits an invoice to a GC; (3) purchase request: the GC approves the invoice, "pay when paid structure" to be discussed with respect to due date; (4) advanced payment: a sub receives early payment via the SPV (funds raised from notes holders); and (5) disbursement: a payment is returned to the SPV and to the noteholders, coming either directly from the GC or from via the sub.

Structural and financing considerations 604 may include: some receivables may need to be passed straight through to the SPV; a buyer-led or supplier-led structure (subcontractor-led is also possible); markets would be responsible for distribution of notes to investors; Leadership in Energy and Environmental Design ("LEED") certificates may be used for sustainable finance; financing considerations: sub revenue, receivables size, debtor location, tracking/reporting, prepayments, ESG, and performance history.

Roles in structure 606 may include GPS 608. Roles in structure 606 may include financing/markets 610.

GPS 608 may include: a conduit with an ERP and owner of data provided; owner of relationships with contractors/sub-contractors; and oversight on process flow.

Financing/markets 610 may include: pricing of notes using data provided by the ERP/GPS; and owner of relationships with noteholders.

Figure 6B:
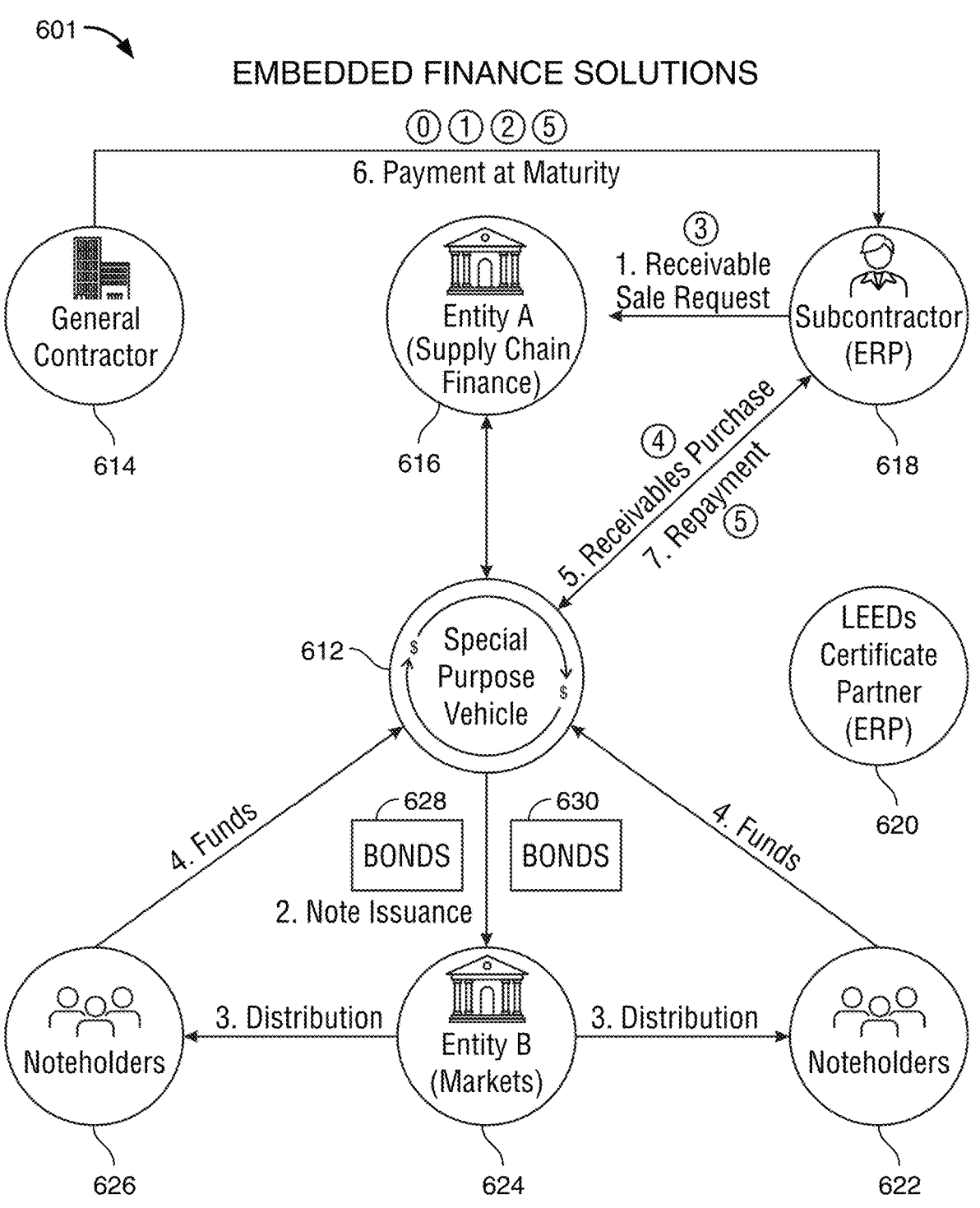
FIG. 6B shows a second part of illustrative process flow 600, illustrative process flow 601, for an integrated supply chain automation platform in accordance with principles of the disclosure.

FIG. 6B shows a second part of illustrative process flow 600, illustrative process flow 601 for an integrated supply chain automation platform in accordance with principles of the disclosure. Illustrative process flow 601 may include embedded finance solutions, which may be the same or different from other disclosed embedded finance solutions. In FIG. 6B, steps from FIG. 6A are depicted as circled numbers.

Embedded finance solutions within illustrative process flow 601 may include special purpose vehicle ("SPV") 612, general contractor 614, Entity A (e.g., supply chain finance) 616, subcontractor (ERP) 618, LEED certificate partner (ERP) 620, noteholders 622, Entity B (e.g., markets) 624, noteholders 626, bonds 628, and bonds 630. The general contractor 614 may be in communication with the subcontractor (ERP) 618. The subcontractor (ERP) 618 may be in communication with Entity A (e.g., supply chain finance) 616.

The subcontractor (ERP) 618 may be in communication with Entity A (e.g., supply chain finance) 616 involving: a receivable sale request 1. Receivable sale request 1 may include step (3) from process framework 602 in FIG. 6A.

The SPV 612 may be in communication with the Entity B (e.g., markets) 624. The SPV 612 may be in communication with the Entity B (e.g., markets) 624 involving: note issuance 2. Note issuance 2 may include issuing bonds 628 and bonds 630.

Entity B (e.g., markets) 624 may be in communication with noteholders 622 and noteholders 626. Entity B (e.g., markets) 624 may be in communication with noteholders 622 and noteholders 626 involving: distribution 3.

The noteholders 622 and noteholders 626 may be in communication with the SPV 612. The noteholders 622 and noteholders 626 may be in communication with the SPV 612 involving: funds 4.

The SPV 612 may be in two-way communication with the subcontractor (ERP) 618. The SPV 612 may be in two-way communication with the subcontractor (ERP) 618 involving: receivables purchase 5; and repayment 7. Receivables purchase 5 may involve step (4) from process framework 602 in FIG. 6A. Repayment 7 may involve step (5) from process framework 602 in FIG. 6A. SPV 612 may be in two-way communication with Entity A (e.g., supply chain finance) 616.

The general contractor 614 may be in communication with the subcontractor (ERP) 618 involving: payment at maturity 6. Payment at maturity 6 may include any combination of steps (0), (1), (2), and (5) from process framework 602 in FIG. 6A.

The disclosure may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Thus, methods and systems for digital platform supply chain solutions for an integrated supply chain automation platform are provided. Persons skilled in the art will appreciate that the present disclosure can be practiced in other ways. The described embodiments are presented for purposes of illustration—not limitation—and the present disclosure is limited only by the claims that follow.

What is claimed is:

1. A system for providing digital platform supply chain solutions for an integrated supply chain automation platform by transforming physical documentation into digital documentation, the system comprising:

the integrated supply chain automation platform ("the platform"), the platform comprising a plurality of integrated supply chain automation processors;

an artificial intelligence/machine learning ("AI/ML") processor, the AI/NIL processor operable to parse uploaded documents, output matched documents, and identify discrepancies within the platform;

a network of applications, the network of applications contained in a hybrid cloud environment; and a middleware engine, the middleware engine operable to connect, within the hybrid cloud environment: the platform, the AI/ML processor, and the network of applications;

wherein the system is operable to:

receive, via the platform, scans of physical documentation for supply chain transactions;

perform, via the AI/ML processor, optical character recognition ("OCR") on the scans producing digital data, the digital data comprising digital forms of the physical documentation for the supply chain transactions;

transmit, via the middleware engine, the digital data to the network of applications using application programming interfaces ("APIs") in the plurality of integrated supply chain automation processors;

enable, via the network of applications, a plurality of entities to use the digital data for supply chain financing ("SCF") operations;

perform, via the AI/ML processor, natural language processing ("NLP") on the digital data, the NLP producing output regarding the digital data complying with digital data standards;

compare, via the AI/ML processor, the output to document standard trade product definitions ("DSTPD"), the DSTPD comprising the digital data standards;

modify, via the platform, trade products and associated operational delivery products for the supply chain transactions to bring the digital data into compliance with the digital data standards; and execute, via the platform, the supply chain transactions based on the digital data, the SCF operations, the trade products, and associated operational delivery products, wherein the platform is within a provider layer, the provider layer interacting, via the middleware engine, with a participant layer, wherein the participant layer is within a data layer, the data layer comprising data aggregators, industry ecosystems, and data providers.

2. The system of claim 1 wherein the SCF operations comprise payables and receivables, letters of credit, guarantees, compliance checking, risk distribution, and operations conducting business with buyers and suppliers involved in international trade.

3. The system of claim 1 wherein the DSTPD comprise standards for Letters of Credit ("LCs"), Standby Letters of Credit ("SBLCs"), and Guarantees to UCP600, URDG 758, and ISP98.

4. The system of claim 1 wherein the digital data standards are defined by World Trade Organization ("WTO").

5. The system of claim 1 wherein the platform comprises a manual override, the manual override operable to deny the supply chain transactions.

6. The system of claim 1 wherein the supply chain transactions comprise stages of:

pre-transaction comprising supply chain sourcing and selection;

order comprising supply chain procurement;

fulfillment & matching comprising purchase order fulfillment; and discrepancy matching comprising managing discrepancies in the digital data.

7. The system of claim 1 wherein the system expands a data set within the platform and increases efficiency of AI/ML decisioning and transactions within the platform by analysis of the digital data.

8. The system of claim 1 wherein the platform is operable to execute additional supply chain transactions with the plurality of entities by the system increasing a transparency of the digital data.

9. The system of claim 1 wherein the platform is operable to execute additional supply chain transactions with the plurality of entities by the system providing the platform access to external transactions.

10. A method for providing digital platform supply chain solutions for an integrated supply chain automation platform by transforming physical documentation into digital documentation, the method comprising:

receiving, via the integrated supply chain automation platform ("the platform"), scans of physical documentation for supply chain transactions;

performing, via an AI/ML processor, optical character recognition ("OCR") on the scans producing digital data, the digital data comprising digital forms of the physical documentation for the supply chain transactions;

transmitting, via a middleware engine, the digital data to a network of applications using application programming interfaces ("APIs") in a plurality of integrated supply chain automation processors;

enabling, via the network of applications, a plurality of entities to use the digital data for supply chain financing ("SCF") operations;

performing, via the AI/ML processor, natural language processing ("NLP") on the digital data, the NLP producing output regarding the digital data complying with digital data standards;

comparing, via the AI/ML processor, the output to document standard trade product definitions ("DSTPD"), the DSTPD comprising the digital data standards;

modifying, via the platform, trade products and associated operational delivery products for the supply chain transactions to bring the digital data into compliance with the digital data standards; and executing, via the platform, the supply chain transactions based on the digital data, the SCF operations, the trade products, and associated operational delivery products, wherein the platform is within a provider layer, the provider layer interacting, via the middleware engine, with a participant layer, wherein the participant layer is within a data layer, the data layer comprising data aggregators, industry ecosystems, and data providers.

11. The method of claim 10 wherein the SCF operations comprise payables and receivables, letters of credit, guarantees, compliance checking, risk distribution, and operations conducting business with buyers and suppliers involved in international trade.

12. The method of claim 10 wherein the DSTPD comprise standards for Letters of Credit ("LCs"), Standby Letters of Credit ("SBLCs"), and Guarantees to UCP600, URDG 758, and ISP98.

13. The method of claim 10 wherein the digital data standards are defined by World Trade Organization ("WTO").

14. The method of claim 10 wherein the platform comprises a manual override, the manual override operable to deny the supply chain transactions.

15. The method of claim 10 wherein the supply chain transactions comprise stages of:

pre-transaction comprising supply chain sourcing and selection;

order comprising supply chain procurement;

fulfillment & matching comprising purchase order fulfillment; and discrepancy matching comprising managing discrepancies in the digital data.

16. The method of claim 10 wherein the method further comprises expanding a data set within the platform and increasing efficiency of AI/ML decisioning and transactions within the platform by analysis of the digital data.

17. The method of claim 10 wherein the platform is operable to execute additional supply chain transactions with the plurality of entities by increasing a transparency of the digital data.

18. The method of claim 10 wherein the platform is operable to execute additional supply chain transactions with the plurality of entities by providing the platform access to external transactions.

\* \* \* \* \*